(12) United States Patent
Morgan et al.

(10) Patent No.: US 11,373,199 B2
(45) Date of Patent: Jun. 28, 2022

(54) METHOD AND SYSTEM FOR GENERATING ENSEMBLE DEMAND FORECASTS

(71) Applicant: Target Brands, Inc., Minneapolis, MN (US)

(72) Inventors: Adam Morgan, Minneapolis, MN (US); Anand Das, Bangalore (IN); Samir H Shah, San Jose, CA (US); Phillip Yelland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 98 days.

(21) Appl. No.: 16/172,575

(22) Filed: Oct. 26, 2018

(65) Prior Publication Data

US 2020/0134640 A1 Apr. 30, 2020

(51) Int. Cl.
*G06Q 30/02* (2012.01)
*G06Q 10/08* (2012.01)
*G06N 3/04* (2006.01)

(52) U.S. Cl.
CPC ....... *G06Q 30/0202* (2013.01); *G06N 3/0445* (2013.01); *G06Q 10/087* (2013.01)

(58) Field of Classification Search
CPC ............ G06Q 30/0202; G06Q 10/087; G06N 3/0445; G06N 3/0454; G06N 3/08; G06N 20/20
See application file for complete search history.

(56) References Cited

U.S. PATENT DOCUMENTS

| | | |
|---|---|---|
| 5,461,699 A | 10/1995 | Arbabi et al. |
| 7,610,214 B1 | 10/2009 | Dwarakanath et al. |
| 7,788,127 B1 * | 8/2010 | Gilgur .................... G06Q 10/00 705/7.31 |
| 8,732,039 B1 | 5/2014 | Chen et al. |
| 2005/0192915 A1* | 9/2005 | Ahmed .................... G06N 3/02 706/21 |

(Continued)

FOREIGN PATENT DOCUMENTS

| | | | |
|---|---|---|---|
| WO | 2008092147 A2 | 7/2008 | |
| WO | WO-2008092147 A2 * | 7/2008 | ............. G06Q 30/02 |

(Continued)

OTHER PUBLICATIONS

Brocker, J., Smith, L.A. "From Ensemble Forecasts to Predictive Distribution Functions." Tellus A: Dynamic Meteorology and Oceanography, No. 60A, pp. 663-678. (Year: 2008).*

(Continued)

*Primary Examiner* — Mehmet Yesildag
*Assistant Examiner* — Jeremy L Gunn
(74) *Attorney, Agent, or Firm* — Merchant & Gould P.C.

(57) ABSTRACT

Methods and systems for forecasting demand for a plurality of items are provided. In particular, the demand forecasting system and methods described herein are useful for predicting demand of products in a retail context. Forecast models are built and used to score incoming sales data to predict future demand for items. Forecast models are validated by evaluating actual demand against predicted demand and using that information to inform how future ensemble forecast will be generated. Forecasts may be broken down into smaller components to satisfy a variety of requests for data from client applications.

20 Claims, 15 Drawing Sheets

(56) References Cited

U.S. PATENT DOCUMENTS

| | | | |
|---|---|---|---|
| 2008/0086358 A1* | 4/2008 | Doshi | G06Q 10/04 |
| | | | 705/7.38 |
| 2011/0071885 A1* | 3/2011 | Ayres de Castro | |
| | | | G06Q 30/0202 |
| | | | 705/7.31 |
| 2011/0238461 A1* | 9/2011 | Mulukutla | G06Q 10/04 |
| | | | 705/7.31 |
| 2013/0179220 A1* | 7/2013 | Notani | G06Q 30/0202 |
| | | | 705/7.31 |
| 2014/0372178 A1 | 12/2014 | Hsieh et al. | |
| 2015/0100295 A1* | 4/2015 | Jetcheva | G06F 30/367 |
| | | | 703/18 |
| 2015/0134413 A1* | 5/2015 | Deshpande | G06Q 30/0205 |
| | | | 705/7.31 |
| 2015/0339572 A1 | 11/2015 | Achin et al. | |
| 2016/0239776 A1 | 8/2016 | Feng et al. | |
| 2016/0260052 A1 | 9/2016 | Ray et al. | |
| 2017/0068715 A1* | 3/2017 | Cannaliato | G06F 16/2465 |
| 2017/0220943 A1 | 8/2017 | Duncan et al. | |
| 2020/0134641 A1 | 4/2020 | Morgan et al. | |
| 2020/0134642 A1 | 4/2020 | Morgan et al. | |

FOREIGN PATENT DOCUMENTS

| | | | | |
|---|---|---|---|---|
| WO | 2014049303 A1 | 4/2014 | | |
| WO | WO-2014049303 A1 * | 4/2014 | | G06Q 10/04 |
| WO | 2016073025 A1 | 5/2016 | | |

OTHER PUBLICATIONS

JD Edwards Enterpriseone Demand Consensus—ORACLE® —JD Edwards Enterprise One (Supply Chain Planning), Oracle JD Edwards Enterpriseone Demand Consensus Data Sheet, 2006, 4 Pages.

International Search Report and Written Opinion for Application No. PCT/US2019/057899 dated Dec. 18, 2019.

Adyaetal, Principles of Forecasting, 2001, Kluwer Academic Publishers, vol. 1, p. 74, 261-263, 477, 776 (Year 2001).

* cited by examiner

FIG. 14

METHOD AND SYSTEM FOR GENERATING ENSEMBLE DEMAND FORECASTS

TECHNICAL FIELD

The present disclosure relates generally to methods and systems for forecasting demand for items. More specifically, methods and systems are provided for generating demand forecasts for items based on past sales data and past demand forecasts.

BACKGROUND

Demand forecasting involves predicting future demand for products or services of a business or organization. Demand forecasting produces valuable information for businesses to use in production planning, inventory management, staff scheduling, and supply chain management. It is important to know how much inventory is needed to order and stock at various locations of a retail chain. Demand forecasting information can be useful not only for inventory management, but for scheduling personnel, planning marketing events, and budgetary planning.

Techniques for forecasting demand range from simply estimating demand based on past experience, which may be effective for smaller businesses or more predictable businesses. Demand can be calculated using a variety of statistical models and algorithms. Such models and algorithms typically rely on past data to predict future demand.

It can be difficult to accurately predict future demand for products, especially when taking into account seasonal changes in demand for particular products. This is further complicated for retailers offering a multitude of products, e.g. millions. There is a need for improved methods of forecasting demand for a large number of products taking into account seasonal changes in demand.

SUMMARY

In summary, the present disclosure relates to methods and systems for forecasting item demand in a retail context. Various aspects are described in this disclosure, which include, but are not limited to, the following aspects.

In a first aspect, a system for forecasting demand for a plurality of items is disclosed. The system includes a common data preparation engine. The common data preparation engine includes a computing system including a data store, processor, and memory communicatively coupled to the processor, the memory storing instructions executable by the processor to: receive sales data, convert sales data to common format data, and store common format data in a standard data store. The system also includes an enterprise forecast engine. The enterprise forecast engine includes a computing system including a processor, and a memory communicatively coupled to the processor, the memory storing instructions executable by the processor to: build a forecasting model; access the common format data; generate an aggregate demand forecast using the forecasting model and the common format data; and communicate demand forecast to a forecast data store for storage. The system further includes a server comprising an API accessible by one or more client applications, the API configured to: receive requests for demand forecasts, communicate demand forecast requests to the forecasts data store, and receive demand forecasts from the forecasts data store.

In a second aspect, a method of forecasting demand for a plurality of items within a retail enterprise is disclosed. The method includes receiving sales data at a common data preparation engine, formatting the sales data into a common format, and building, with an enterprise forecast engine, an ensemble forecast model from two or more component models. The method further includes analyzing, with the ensemble forecast model, the common format data to generate an aggregate demand forecast, and storing the aggregate demand forecast in a forecasts data store.

In a further aspect, a non-transitory computer-readable storage medium comprising computer-executable instruction which, when executed by a computing system, cause the computing system to perform a method of generating a demand forecast for one or more items. The method includes receiving store sales data and web sales data at a common data preparation engine, and formatting the store sales data and web sales data into a common format. The method also includes building, with an enterprise forecast engine, an ensemble forecast model from two or more component models, and analyzing, with the ensemble forecast model, the common format data to generate a demand forecast, as well as storing the aggregate demand forecast in a forecasts data store. The method further includes receiving, at an API, a request from an administrator computing device for a demand forecast, communicating the request to the forecasts data store, and communicating the demand forecast to a user interface on the administrator computing device. In some aspects, the method includes visualizing the demand forecast on a display of the administrator computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 14 illustrates a more detailed view of the details section of the example user interface of FIG. 9;

DETAILED DESCRIPTION

Figure 1:
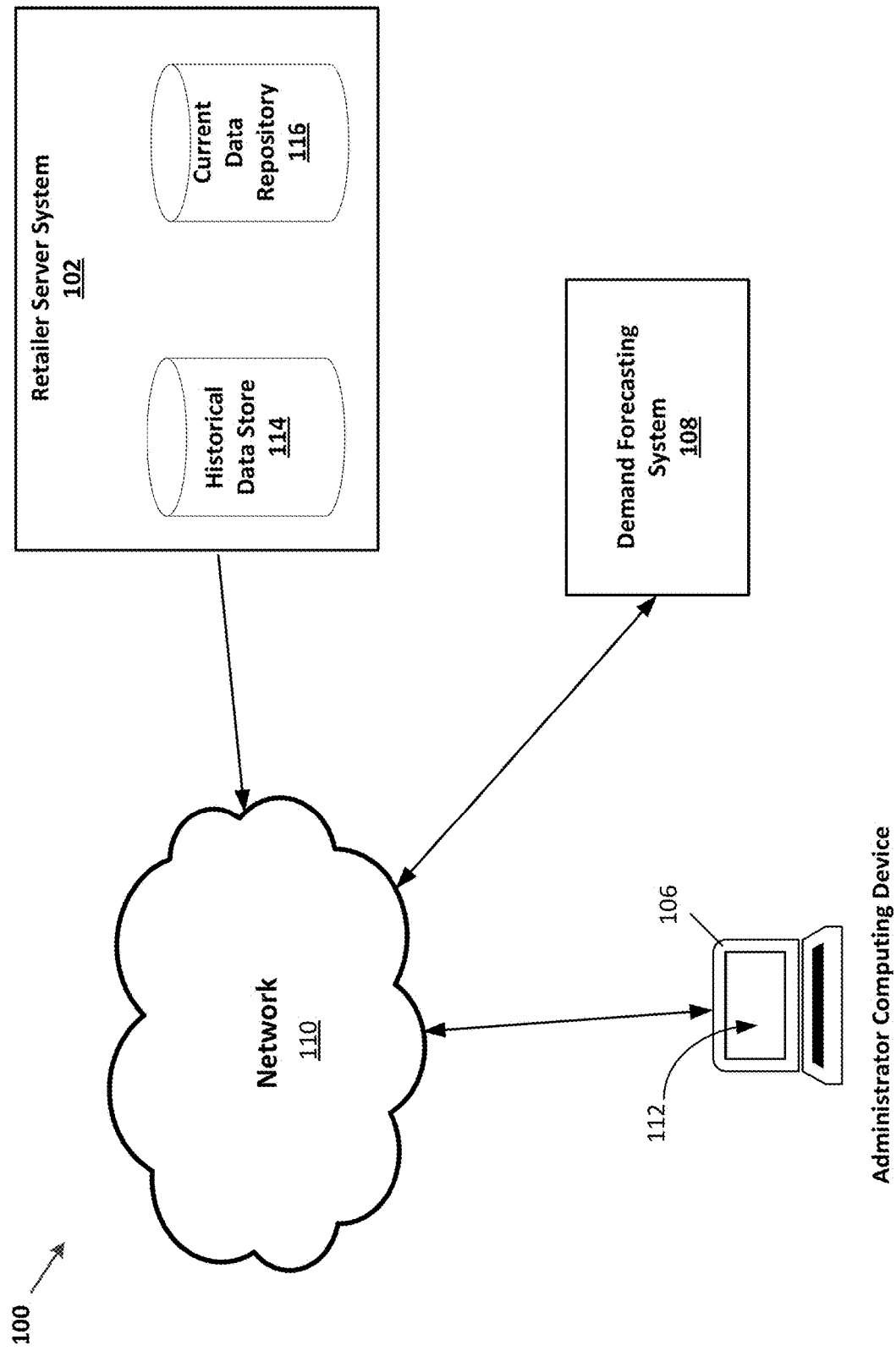
FIG. 1 illustrates a schematic diagram of an system for forecasting item demand in a retail context.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for forecasting demand for a plurality of items. In particular, the demand forecasting system and methods described herein are useful for predicting demand of products in a retail context. An ensemble forecast is compiled using component models that are combined and weighted to produce a consensus forecast for predicting item demand. Past forecasting performance is evaluated to determine which models are best used for particular sets of items. Models having superior performance for predicting item demand are weighted more heavily in the overall consensus forecast. Forecast models are validated by evaluating actual demand vs. predicted demand and using that information to inform how a future ensemble forecast will be generated. The present methods have an improved ability to capture seasonal effects on demand such as holiday sales or back to school sales. The systems and methods are scalable and customizable to different applications of the forecast data. For example, a forecast may be generated on a weekly basis at the chain level for a group of retail stores. However, the forecast can be broken down to an individual store or an individual date.

FIG. 1 illustrates a schematic diagram of an example computing network 100 used in the operation of a retail chain. A retailer server system 102, an administrator computing device 106, and a demand forecasting system 108 are in communication through a network 110. The network 110 may also be in communication with other computing devices and systems within the retail chain. Data from the historical data store 114 and current data repository 116 are communicated to the demand forecasting system 108 to calculate future demand for items within the retailer. The administrator computing device 106 communicates with the demand forecasting system 108 through the network 110 to request demand forecasts, evaluate forecasts generated by the demand forecasting system 108 and visualize those results. The requesting, evaluating, and visualizing may occur with the assistance of a user interface 112 displayed on the administrator computing device 106.

Figure 2:
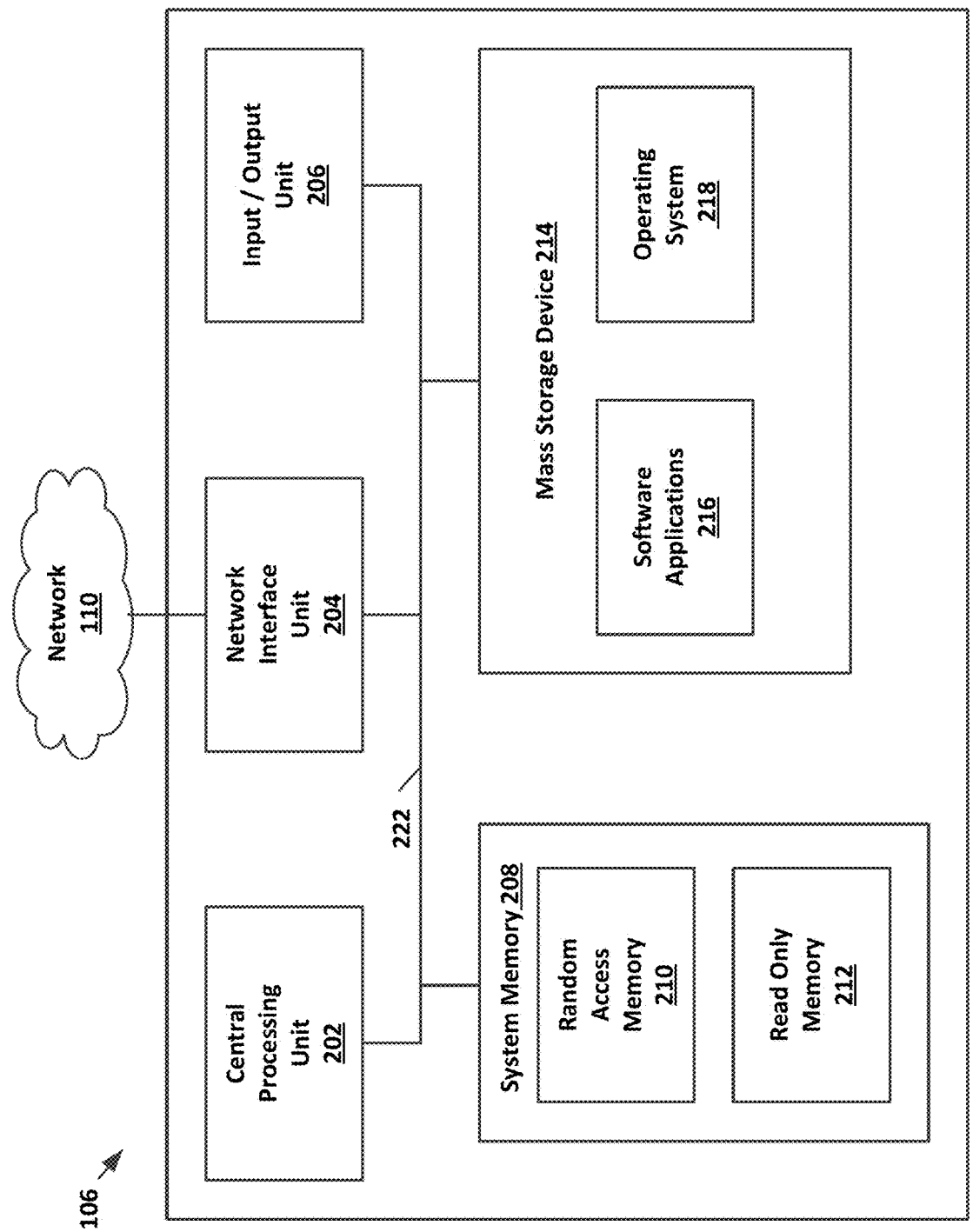
FIG. 2 illustrates an example block diagram of a computing system usable in the system of FIG. 1.

Referring now to FIG. 2, an example block diagram of a computing system 106 is shown that is useable to implement aspects of the computing system 100 of FIG. 1. In the embodiment shown, the computing system 106 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing system 106, such as during startup, is stored in the ROM 212. The computing system 106 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable storage media provide non-volatile, non-transitory data storage for the computing system 106. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 106.

According to various embodiments of the invention, the computing system 106 may operate in a networked environment using logical connections to remote network devices through a network 222, such as a wireless network, the Internet, or another type of network. The computing system 106 may connect to the network 222 through a network interface unit 404 connected to the system bus 422. It should be appreciated that the network interface unit 404 may also be utilized to connect to other types of networks and remote computing systems. The computing system 200 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing system 106 can store software instructions and data. The software instructions include an operating system 418 suitable for controlling the operation of the computing system 106. The mass storage device 414 and/or the RAM 410 also store software instructions, that when executed by the CPU 402, cause the computing system 106 to provide the functionality discussed in this document. For example, the mass storage device 414 and/or the RAM 410 can store software instructions that, when executed by the CPU 402, cause the computing system 106 to receive and analyze inventory and demand data.

Figure 3:
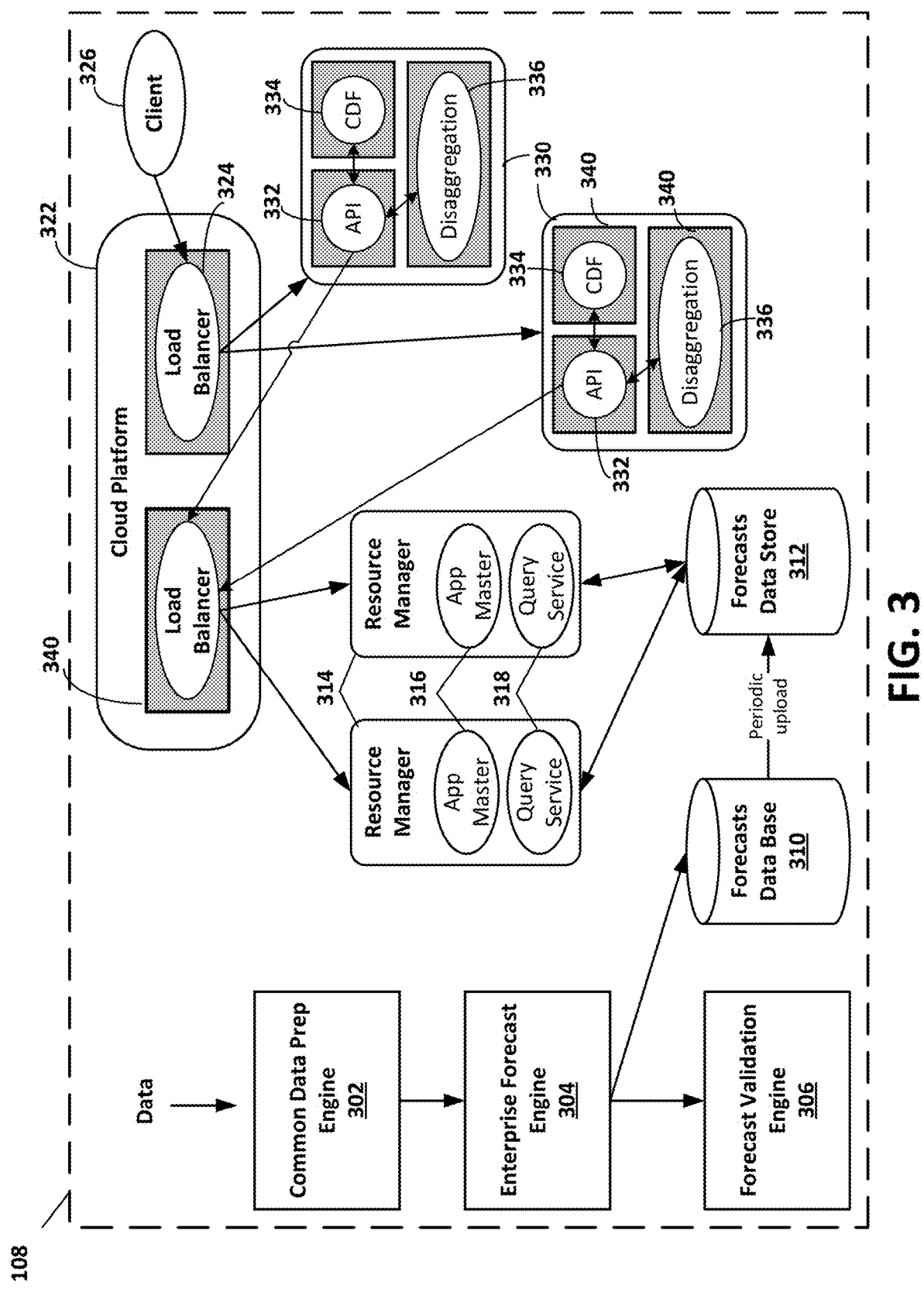
FIG. 3 illustrates a more detailed schematic diagram of the demand forecasting system of FIG. 1.

FIG. 3 illustrates a detailed schematic of the demand forecasting system 108. The components of the demand forecasting system 108 include a common data preparation engine 302, an enterprise forecast engine 304, a forecast validation engine 306, a forecasts data base 310, a forecasts data store 312, one or more resource managers 314, and a cloud platform 322 including one or more load balancers 340 and a plurality of servers 330. The components of the demand forecasting system 108 are described in detail with reference to the method 400 of FIG. 4.

Figure 4:
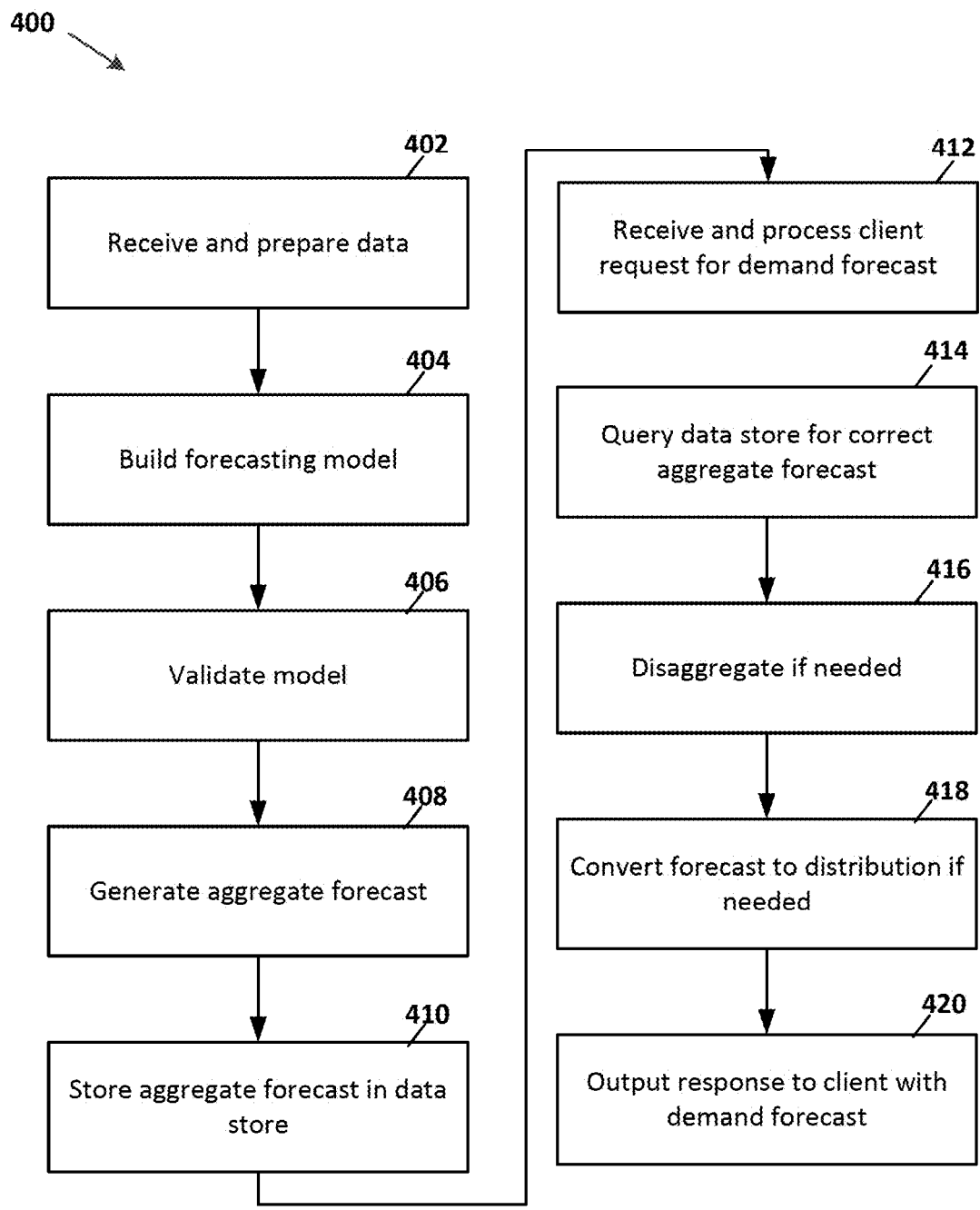
FIG. 4 is a flow chart of an example method of forecasting item demand.

FIG. 4 illustrates an example flow chart of a method 400 of forecasting demand that may be implemented by the demand forecasting system 108 of FIG. 3.

At operation 402, the common data preparation engine 302 receives and prepares past sales data and past demand forecasts. The common data preparation engine 302 receives and prepares both past data and incoming current data. The data can include sales activity as well as other data regarding attributes of items, stores, and locations.

Figure 5:
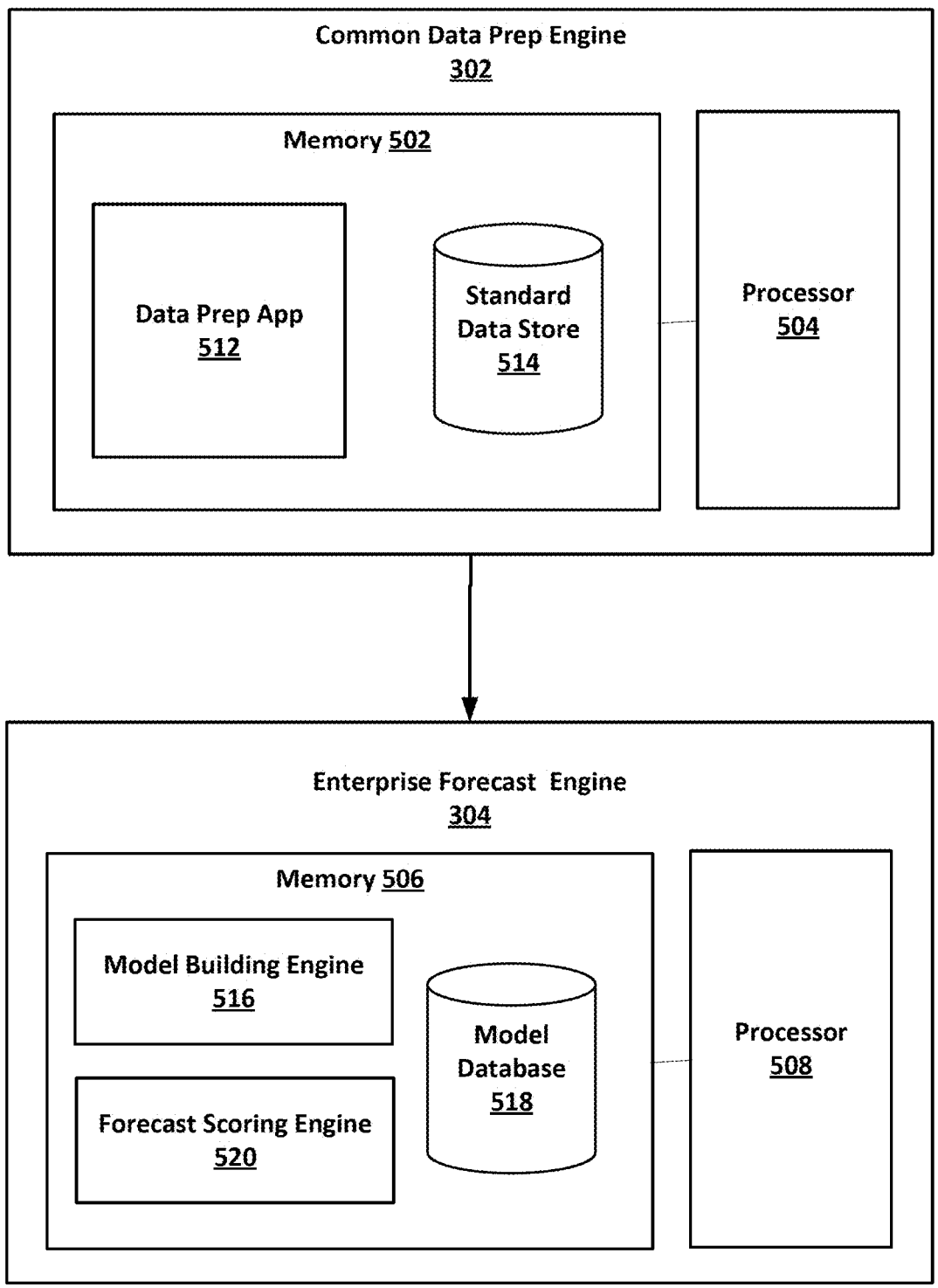
FIG. 5 shows a more detailed schematic diagram of the common data prep engine and enterprise forecast engine of FIG. 3.

The data is processed into a common format for use by the enterprise forecast generator 304. A more detailed view of a schematic of the common data preparation engine 302 is depicted in FIG. 5.

At operation 404, a demand forecasting model is built. In some embodiments, forecasts are generated using a single model, such as a recurrent neural network (RNN) model. In other embodiments, an enterprise "consensus" model is built from combining two or more component models. Methods of building forecasting models are further described in FIG. 6.

In some embodiments, the forecasting models are typically built using python or R software programming languages. The component models are generally selected from time series forecasting models such as recurrent neural network (RNN) models or Autoregressive integrated moving average models (ARIMA), seasonal trend decomposition by LOESS (STL). The component models are fed into a meta-forecaster to produce a compounded or consensus forecast. In some embodiments, weighting of the component models is done based on an affine function equation.

In example embodiments, the past performance of the component models is assessed for accuracy in forecasting. Accuracy alone is not the most important aspect but capturing seasonal effects can also be important. The models having the best performance for predicting demand are weighted more heavily and used in combination to predict the latest demand forecast. The weighted combination provides a more accurate representation of demand than any individual component model. The weighting of the models can change throughout the year based on, e.g., promotions or seasonality.

Returning to operation 406 of FIG. 4, the model is validated at the forecast validation engine 306 of FIG. 3. The model is tested for its ability to forecast item demand using past data for testing. The validation process is further described in reference to FIG. 8 and the forecast validation engine 306 is further described in detail in FIG. 7.

At operation 408, an aggregate demand forecast is generated. The enterprise forecast engine 304 generates demand forecasts in batches by default. In one embodiment, forecasts are generated for each item, across all stores in a retail chain, every week.

At operation 410, the aggregate forecasts are stored in a data store. In the embodiment shown in FIG. 3, the forecasts are communicated to a forecasts database 310. In some embodiments, the forecasts database 310 utilizes Apache Hive tables for storing the aggregate forecasts. The forecasts database 310 is set up to effectively handle batch data uploads. Periodically, the data from the forecasts database 310 is uploaded to the forecasts data store 312. In some embodiments, the forecasts data store 312 utilizes Apache HBASE to store the aggregate forecasts. The forecasts data store 312 is set up to effectively handle real-time data queries from clients.

At operation 412, a request for a demand forecast is received from a client. The client request is received at a cloud platform 322 including one or more load balancers 324, as shown in FIG. 3. The load balancers 324 route the request to one of a plurality of servers 330 to process the request for a demand forecast. Requests are received from clients which can include other computing applications within a retailer network such as an inventory planning application, staffing planning application, or other supply chain application.

In the embodiment of FIG. 3, the demand forecasting system 108 utilizes a plurality of servers 330. The load balancers 324 operate to direct queries from a client 326 to a server 330 that is the least busy with processing other requests or queries. In some embodiments, a single server 330 could be utilized in the system. However, for large quantities of items for a large retailer having multiple locations, having multiple servers 330 is beneficial for efficiency of processing queries. In some embodiments, multiple servers 330 are managed by a cloud platform 322 such as those available from Apache OpenStack. An HAProxy load balancer 324 could be used to distribute queries to different servers 330. Each server 332 has a copy of the needed services or applications for the demand forecasting system 108 to operate efficiently.

In the embodiment shown, each server 330 includes an API (application programming interface) 332, a CDF (cumulative distribution function) 334, and a disaggregation service 336. The API 332 operates to breakdown requests received from clients and communicate requests for data to a data source such as the forecasts data store 312. The API 332 is accessible by one or more client applications for use in various analyses for the retailer. In some embodiments, the API may be accessed through a user interface by an administrator computing device. An administrator user interacts with the user interface using inputs and outputs of the administrator computing device.

A query is received from a client at the API, e.g., as routed from the load balancer 324. The query includes one or more of an item or set of items, a location, a starting time and a time period; other parameters could be included as well, to the extent exposed by the API. For example, the query could be for a weekly forecast in September for all stores in Minnesota. Optionally, the API can also receive a selection of a particular model or model collection with which to forecast demand. Once the API receives the client request it is broken down to determine which data is needed to satisfy the query. The query service 318 is accessed which then accesses the forecasts data store 312 to retrieve the chain level forecast or "aggregate demand forecast." The CDF 334 breaks down the forecast to a distribution. Then the API 332 communicates the requested demand forecast back to the client application. In some embodiments, this involves presenting the requested demand forecast data on a user interface.

The API (application programming interface) 332 operates to receive client requests in real-time. Each API 332 responds to clients 326 on a per-request basis. In some embodiments, the API 332 communicates with the forecasts data store 312 through a resource manager 314. Each resource manager 314 includes an application master 316 and a query service 318. The query service 318 retrieves the requested data from the forecasts data store 312.

In some embodiments, the resource manager 314 may be built using open-source software such as Apache SLIDER. The cloud platform 322 may be built using Apache OpenStack. Returning to the server 330, each application or service within the server 330 may be packaged into a docker container using an Apache Tomcat service.

At operation 416, the aggregate demand forecast is disaggregated, if needed. This can be accomplished via a disaggregation service 336 available at each server 330. The disaggregation service 336 operates to break down aggregate demand forecasts retrieved from the forecasts data store 312 into smaller units of location or time, depending on the client request. Not every request will require disaggregation, but the API processes the request to determine if disaggregation is needed to properly respond to the request. The disaggregation service 336 is further described in relation to FIG. 15.

At operation 418, the forecast is converted to a distribution by the CDF 334 if needed.

Accordingly, as seen in FIG. 3, each server 330 includes a CDF (cumulative distribution function) service 334. This service operates to convert aggregate demand forecasts retrieved by the API into forecast distributions. Not every client request will involve forecast distributions, but for those that do, the API determines that a distribution is needed and communicates with the CDF service 334 to manage that calculation.

At operation 420, the demand forecast is output to the client in response to the client's request. In some embodiments, the client is an administrator user interface and the demand forecast is visualized for viewing, for example, by an administrator user.

FIG. 5 illustrates a more detailed schematic diagram of the common data prep engine 302 and enterprise forecast engine 304. The common data preparation engine 302 receives and prepares data from a retail entity for processing by the enterprise forecast engine 304 in order to generate demand forecasts for the retail entity.

The common data preparation engine 302 includes a memory 502 in communication with a processor 504. The memory 502 includes software applications including a data preparation application 512. The memory also includes data stores or databases including a standard data store 514.

The data preparation application 512, operates to receive data from a retailer that may include catalog data, location data, inventory data, promotion data, planogram data, web sales data, and store sales data. In some embodiments, this data may first be gathered at a server system such as the retailer server system 102 of FIG. 1. This data may be stored permanently in the historical data store 114 or temporarily in the current data repository 116.

The data preparation application 512 may receive data in a variety of formats. Before being accessed by the forecast generator 304, the data received at the common data preparation engine 302 may need to be reformatted for use by the forecast generator 304. The data preparation application 512 operates to standardize the data received so that it may be used by a variety of forecasting models at the forecast generator 304. Preferably, the data signals are converted to a format that has the right balance between standardization and flexibility, as different models utilize data in different ways. The data preparation application 512 overcomes challenges of both scale and flexibility. For retailers having a multitude of retail locations and items, it can be difficult to manage massive amounts of data in different formats. The data preparation application 512 also overcomes challenges relating to providing a common view of data for all forecasting models that may access the data for processing.

In some embodiments, the common data preparation engine 302 saves the processed data from the data preparation application 512 in a standard data store 514. In some embodiments, the standard data store 514 stores the standardized data utilizing data warehouse software that provides capabilities for data summarization, theory, and analysis. One example of such data warehouse software is Apache Hive.

The common data preparation engine 302 processes both building and scoring data. Building data includes past data that is used for building demand forecasting models. Store history and web history are processed at the common data preparation engine 302 for later access by the forecast generator 304 for training various types of demand forecasting models.

Data that is currently being received from store and web sales are processed at the common data prep engine 302 and are forwarded to the enterprise forecast generator 304 where that data is used to generate store forecasts and web forecasts. This data is used for scoring or predicting future demand. The common data preparation engine 302 processes incoming data incrementally. Data stores in the standard data store 514 are updated as new data is received instead of processing all data each time new data is received. The standard data store 514 compiles received and processed data into Hive data tables for later access by the forecast generator. Other examples of data that may be received from the internal systems of the retailer include price data, characteristics of retail stores, and calendar event such as holidays.

Figure 6:
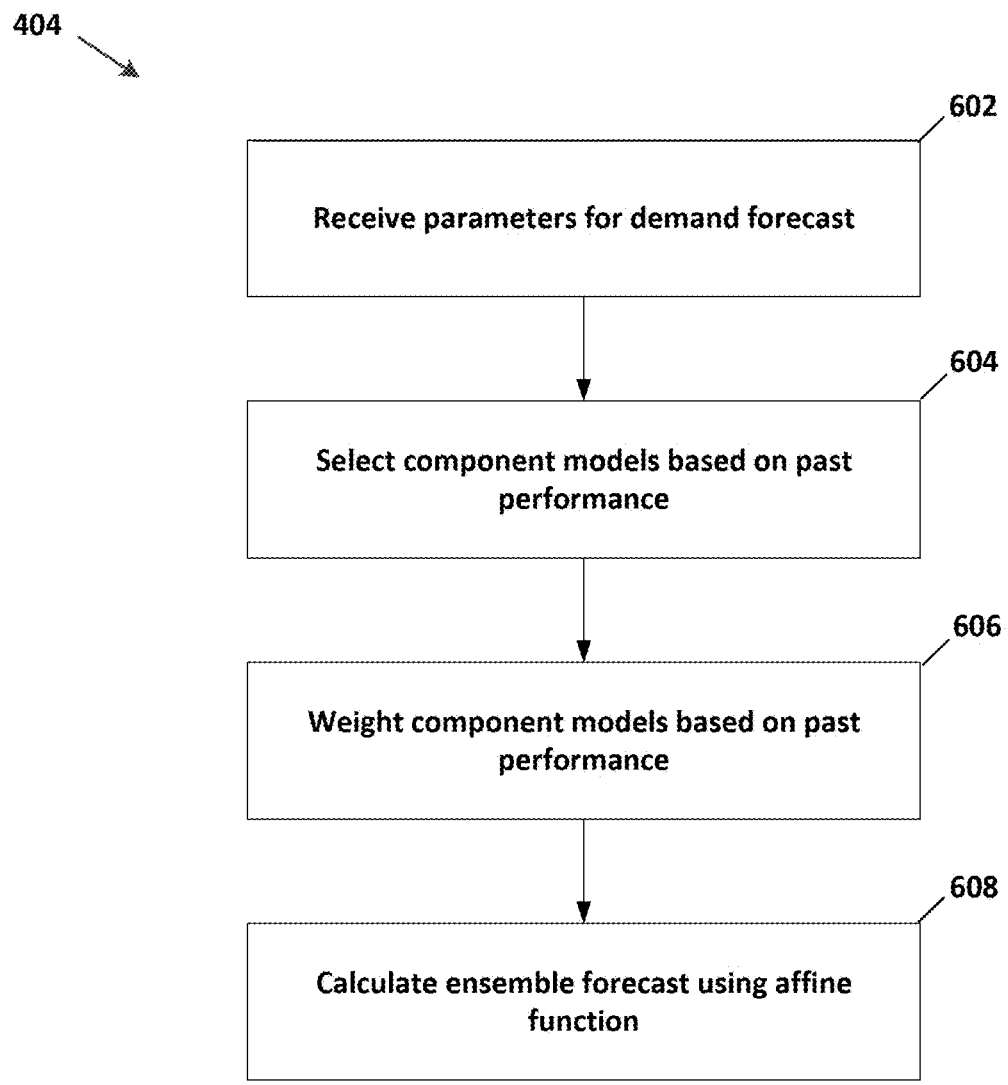
FIG. 6 is a flow chart of an example method of building an ensemble forecasting model.

The enterprise forecast engine 304 includes a models database, a model selection and validation engine, day forecast generator, a memory, and a processor. FIG. 6 illustrates a flowchart of a method 404 of generating item demand forecasts.

The enterprise forecast engine 304 utilizes one or more models to analyze data received from the common data preparation engine 302. In one embodiment, the enterprise forecast engine 304 utilizes one main model based on a recurring neural-network (RNN). In some cases, supplemental models such as an ARIMA or LOESS model can be used in conjunction with the RNN model to accommodate for changes in demand caused by seasonality, holidays, or other variations in demand.

In other embodiments, a meta forecaster makes consensus forecasts for item demands based on an ensemble of component models that are weighted to produce an ensemble model. An ensemble model is constructed around a linear regression of actual demand on demand forecasts produced by component models used to build the ensemble model. Linear regression has the advantages of simplicity, diagnose ability, and familiarity. It may be adapted to emulate other approaches, such as variance weighted combinations or stacked regressions.

In some embodiments, the demand forecasting system utilizes an enterprise forecast engine that utilizes an ensemble of component models to predict future demand for items. The enterprise forecast engine calculates a linear regression of actual demand on demand forecasts produced by the component models in the ensemble. Linear regression has the advantages of simplicity, diagnosability and familiarity. It may be adapted to emulate other approaches, such as variance-weighted combinations or stacked regressions. Linear regression can be extended to implement more elaborate ensembling approaches.

The ensemble model utilizes a weighted combination of two or more component models producing a more accurate representation of demand than any individual component model. The weighted combinations of models are adjusted over time, increasing accuracy as more data is analyzed. FIG. 6 illustrates one example of how an ensemble model is built.

At operation 602, parameters for a demand forecast are received at a forecast generator. Parameters can include one or more of a group of items, a time period, a location, and other attributes. For example, parameters may dictate whether the items to be analyzed are on promotion or off promotion. In another example, the time of year could be during a particular season or not.

At operation 604, component models are selected based on past performance. Add operation 606, the component models are weighted based on the past performance of the component models for the selected parameters. A forecast validation engine 306 evaluates models for their ability to predict demand for items for given time periods and locations. The demand forecasting models are being evaluated on a continuous basis using new data from the retailer as it is generated. Therefore, the forecasting models are also being continually evaluated and updated. As new data is being ingested and analyzed, the overall ensemble model may be updated by choosing different component models or modifying the weighting of the different component models.

In some embodiments, the demand forecaster utilizes a single model. The forecasting model may be supplemented by one or more component models to accommodate for seasonality or promotions. When a single model is implemented by the demand forecaster, a recurring neural network (RNN) is utilized. Supplemental models can include ARIMA, LOESS or STL (seasonal decomposition).

Seasonal demand can be difficult to predict. One example of a component model that is useful for computing seasonal item demand is a wavelet decomposition model WD. The wavelet decomposition model uses wavelet functions e.g. Haar, Symmlet, Daubechies, etc. To decompose time series data into approximated and detail coefficients. Multi-level wavelet decomposition is performed on time series data to find approximation and detail coefficients. the number of decomposition level depends on the length of the time series data. The maximum decomposition level approximation coefficient is used to reconstruct the time series and the reconstructed time series data will be used as trend. Then the actual time series data is detrended using the trend values found. Seasonal indices are calculated by weighted average based on variance using respective weeks indices from trended data.

Another example of a component model useful for computing seasonal item demand uses a combination of spline and GBM decomposition methods. In some instances, trend estimates can be found by fitting a smoothing spline to the time series. In such instances, a smoothing parameter is set to a lower bound in order to avoid overfitting and is determined by cross validation. The time series is detrended using the trend values found. The seasonal indices are found by fitting a GBM to the detrended data.

Algorithms for Ensemble Modeling

The following discusses methods and systems used to generate linear regression-based ensembles that may be implemented by the enterprise forecast engine 304. The methods and systems as implemented herein can use one or more algorithms, discussed below, for implementing such ensemble models. Table 1 lists definitions of terms used in the calculations.

TABLE 1

| | Definitions |
|---|---|
| t | Index of periods (weeks). |
| $i \in 1, \ldots, I$ | Index of models. |

TABLE 1-continued

| | Definitions |
|---|---|
| $j \in 1, \ldots, J$ | Index of features. |
| $y_t$ | Actual demand (sales) during period t. |
| $\hat{y}_{th}^{(i)}$ | Forecast made at time t by model I for period t + h. |
| $\hat{y}_{th}$ | Forecast made at time t by the ensemble for period t + h. |
| $x_{jt}$ | Value of feature j in period t. |

Let $y_t$ be the actual sales of a given item in week t. Assume that there are I models that provide forecasts for $y_t$; the forecast with horizon h (i.e. for period t+h) made by model I in period t is denoted $\hat{y}_{th}^{(i)}$. The ensemble forecast, $\hat{y}_{th}$, is an affine function of the model forecasts:

$$\hat{y}_{th} = \beta_h + \sum_{i=1}^{I} \beta_{iht} \hat{y}_{th}^{(i)} \quad (1)$$

Here the coefficients $\beta_{iht}$ are in turn affine functions of features of the forecast period. The value of feature j in week t, $x_{jt}$ might represent a promotion in period t, for example. Having the coefficients in the ensemble depend on such features accommodates a component model that is more or less accurate in periods of promotion, say. Therefore:

$$\beta_{iht} = \alpha_{ih} + \sum_{j=1}^{J} \alpha_{ihj} x_{j,t+h} \quad (2)$$

The coefficients in equation (1) and equation (2) can be estimated by means of a hierarchical regression:

$$y_{t+h} = \beta_h + \sum_{i=1}^{I} \beta_{iht} \hat{y}_{th}^{(i)} + \epsilon_{ht} \quad (3)$$

$$\beta_{iht} = \alpha_{ih} + \sum_{j=1}^{J} \alpha_{ihj} x_{j,t+h} + \varepsilon_{iht} \quad (4)$$

Substituting equation (4) into equation (3):

$$y_{t+h} = \beta_h + \sum_{i=1}^{I} \left( \alpha_{ih} + \sum_{j=1}^{J} \alpha_{ihj} x_{j,t+h} + \varepsilon_{iht} \right) \hat{y}_{th}^{(i)} + \epsilon_{ht}$$

$$= \beta_h + \sum_{i=1}^{I} \alpha_{ih} \hat{y}_{th}^{(i)} + \sum_{i=1}^{I} \sum_{j=1}^{J} \alpha_{ihj} x_{j,t+h} \hat{y}_{th}^{(i)} + \sum_{i=1}^{I} \hat{y}_{th}^{(i)} \varepsilon_{iht} + \epsilon_{ht}$$

Combining the noise terms, and relabeling the coefficients produces an equivalent estimator for $y_t$+h;

$$y_{t+h} = \lambda_h + \sum_{i=1}^{I} \lambda_{hi} \hat{y}_{th}^{(i)} + \sum_{i=1}^{I} \sum_{j=1}^{J} \lambda_{hij} x_{j,t+h} \hat{y}_{th}^{(i)} + \eta_{ht} \quad (5)$$

Similarly, the ensemble forecast becomes:

$$\hat{y}_{th} = \lambda_h + \sum_{i=1}^{I} \lambda_{hi}\hat{y}_{th}^{(i)} + \sum_{i=1}^{I}\sum_{j=1}^{J} \lambda_{hij} x_{j,t+h} \hat{y}_{th}^{(i)} \qquad (6)$$

To estimate the coefficients in equation (5) for a given item and horizon h:[2]

1. For all t such that we have a record of actual sales in period t+h, gather the available model forecasts $\hat{y}_{th}^{(i)}$, where I indexes those models that made a forecast for the stipulated item with horizon h in period t.

2. For each t in the previous step, locate actual sales $y_{t+h}$ and all features $x_{j,t+h}$.

3. Run the regression in equation (5), to yield estimates for the coefficients and $\lambda_h$, $\lambda_{hi}$ and $\lambda_{hij}$.

With coefficient estimates from the procedure above, to produce an ensemble forecast for a particular item in week t for week t+h (i.e. with horizon h all available model forecasts are loaded for the item made in the current week for week t+h, i.e. $\hat{y}_{th}^{(i)}$. The ensemble forecast is calculated using the affine function defined in equation (6), above.

Forecast Validation Engine

Figure 7:
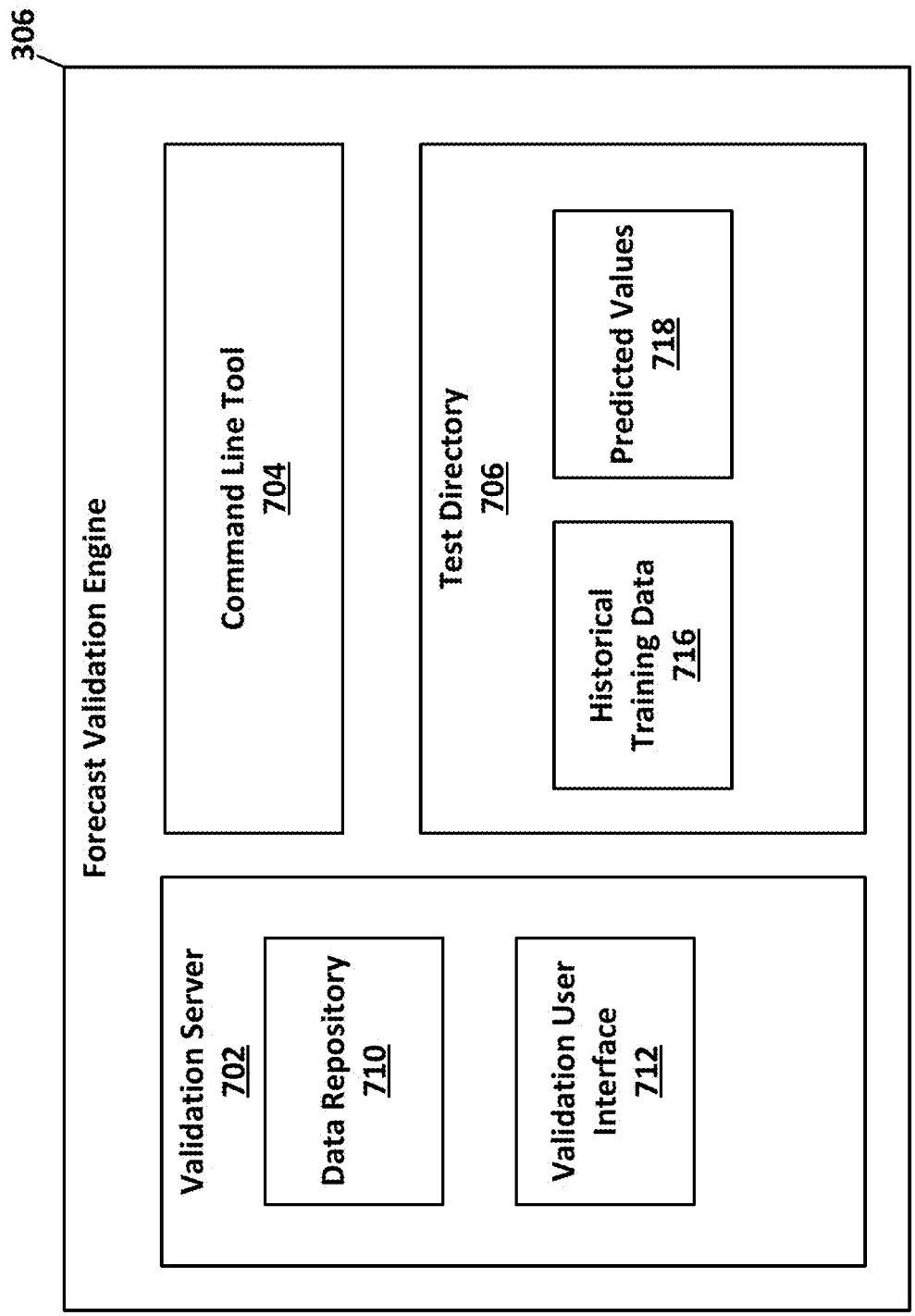
FIG. 7 shows a more detailed schematic diagram of the forecast validation engine of FIG. 3.

FIG. 7 illustrates a detailed schematic diagram of the forecast validation engine 306 of FIG. 3. The forecast validation engine 306 includes a validation server 702, a command line tool 704, and a test directory 706.

The forecast validation engine 306 operates to evaluate and validate models built to forecast demand. The forecast validation engine 306 runs multiple forecasts for the same set of sales data and store the results in a table. Metrics are run on the table to cross-validate distributions. The metrics may be entered by an administrator user or selected from a menu.

The validation server 702 includes a data repository 710 and a validation user interface 712. The data repository 710 stores forecast validation results obtained from forecasting models used in the demand forecasting system 108. The validation user interface 712 is accessible from an administrator computing device such as the administrator computing device 106 of FIG. 1. The validation user interface 712 allows a user to access a variety of visualization tool to assist with the inspection and visualization of forecast validation results.

The command line tool 704 operates to receive uploaded validation sets and prepare them for the validation server 702.

Figure 8:
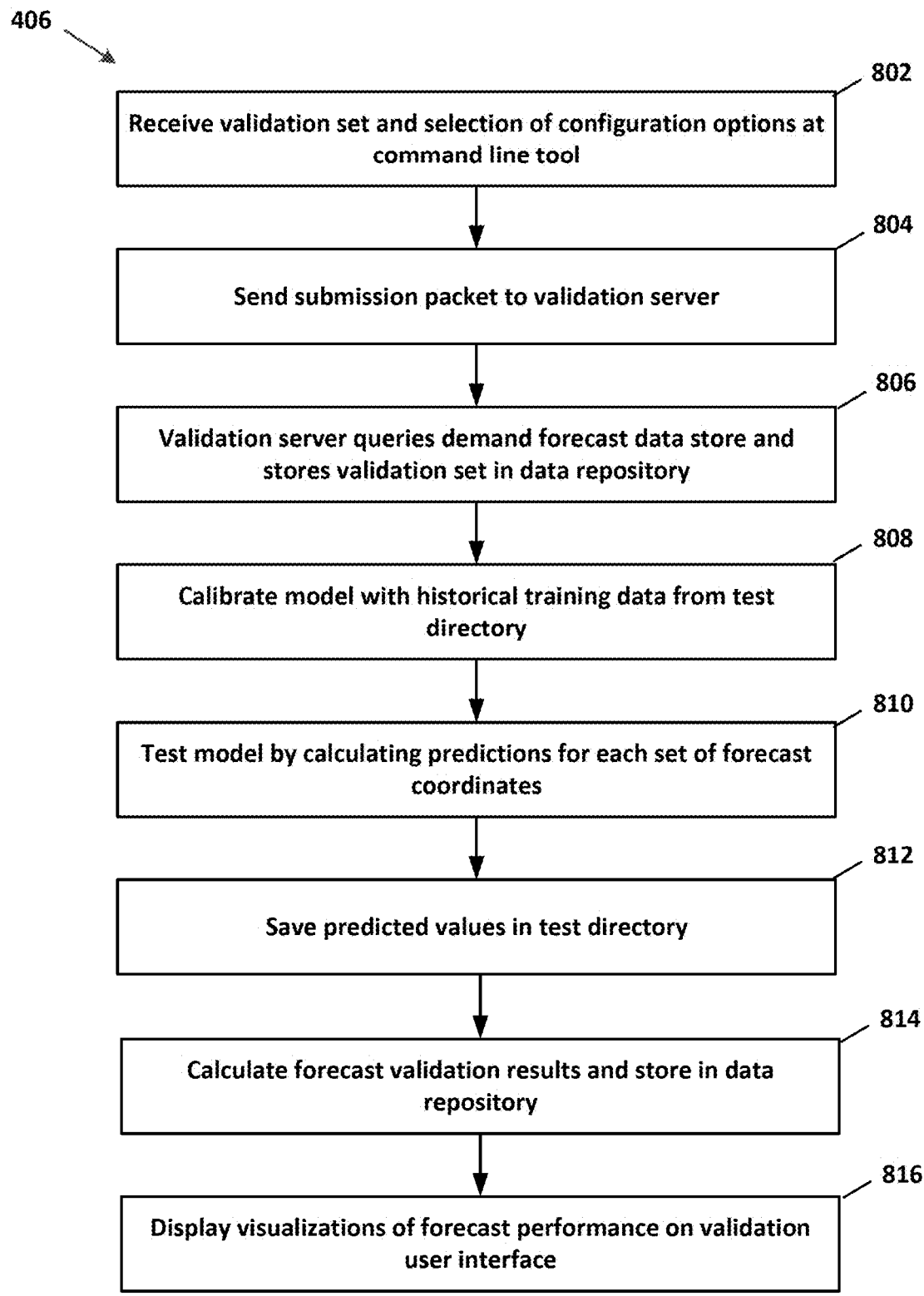
FIG. 8 is a flow chart of an example method of validating a forecasting model.

FIG. 8 illustrates a flow chart of an example method 406 of validating and visualizing a demand forecasting model. In some aspects, this method is performed by the forecast validation engine 306 of FIGS. 3 and 7.

At operation 802, a validation set and accompanying configuration options are received at the command line tool 704. An administrator user may upload the validation set through interactions with the validation user interface 712. The validation set is a data set of forecasted values calculated by the forecasting model to be validated. Configuration options include identifying tags, and selecting metrics to be examined.

At operation 804, a submission packet including the validation set, selected configuration options, and identifying information for the data set is sent to the validation server 802. Upon receipt of the submission packet, the validation server 702 carries out a series of checks to ensure that the submission packet has the information required for the validation server 802 to perform its analysis.

At operation 806, the validation server 702 queries the forecasts data store 312 to retrieve the forecast data generated by the forecasting model being validated. The validation set is stored in the data repository 810.

At operation 808, the model is calibrated using historical training data 716 from the test directory 706. The historical training data 716 includes values of the forecast quantity. In some embodiments, the test directory 706 also stores ancillary data that may be relevant to the model such as item features, holiday information, seasonal information, etc.

At operation 810, the model is tested by calculating predictions for each set of forecast coordinates. The calculated predictions for the set of forecast coordinates can be compared to known data or to other forecasts to determine differences between such results (e.g., to determine outliers or variance outside a threshold.

At operation 812, the predicted values 718 are saved in the test directory 706. The predicted values can be saved in various forms, including in a database, or any other convenient file format useable for analysis.

At operation 814, the forecast validation results are calculated at the validation server 702 and are stored in the data repository 710. Forecast validation results can be, as noted above, At operation 816, visualizations of forecast performance are displayed on the validation user interface 712. The validation user interface 712 allows an administrator user to select various options for viewing and comparing validation results. Examples of visualizations include box plots, Q-Q plots, histograms, and CDF plots.

Figure 9:
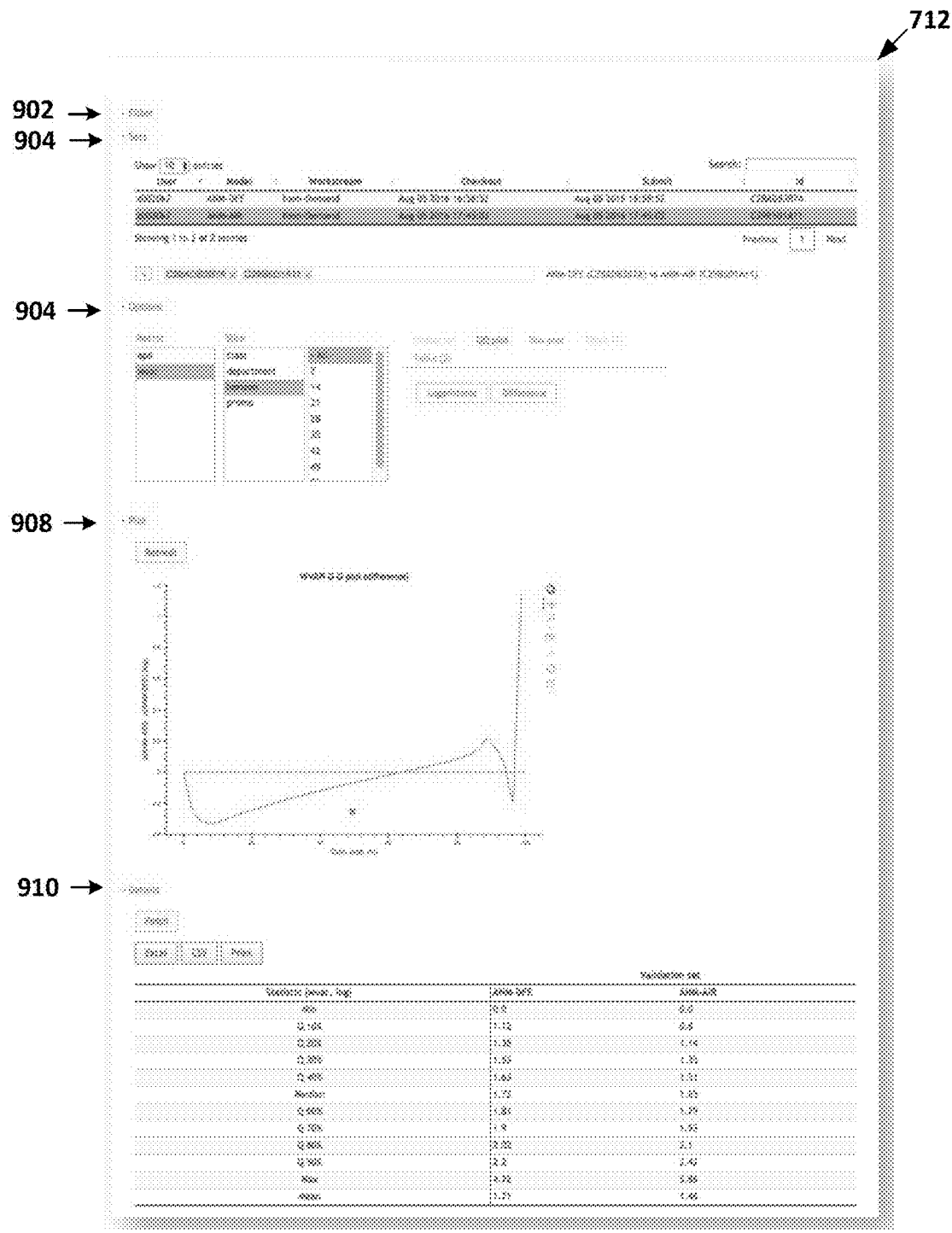
FIG. 9 illustrates an example user interface for validating forecasting models.

The forecast validation engine 306 includes a validation user-interface 712. FIG. 9 depicts an example validation user-interface 712. This user interface provides a web-based front-end viewable in a browser window that allows uploaded validation sets to be examined and compared using a range of visualizations. In the example validation user interface 712 of FIG. 9, the display is divided into five collapsible sections. Each section is discussed in greater detail in FIGS. 10-14. The sections include a filter 902, sets 904, options 906, plot 908, and details 910.

Figure 10:
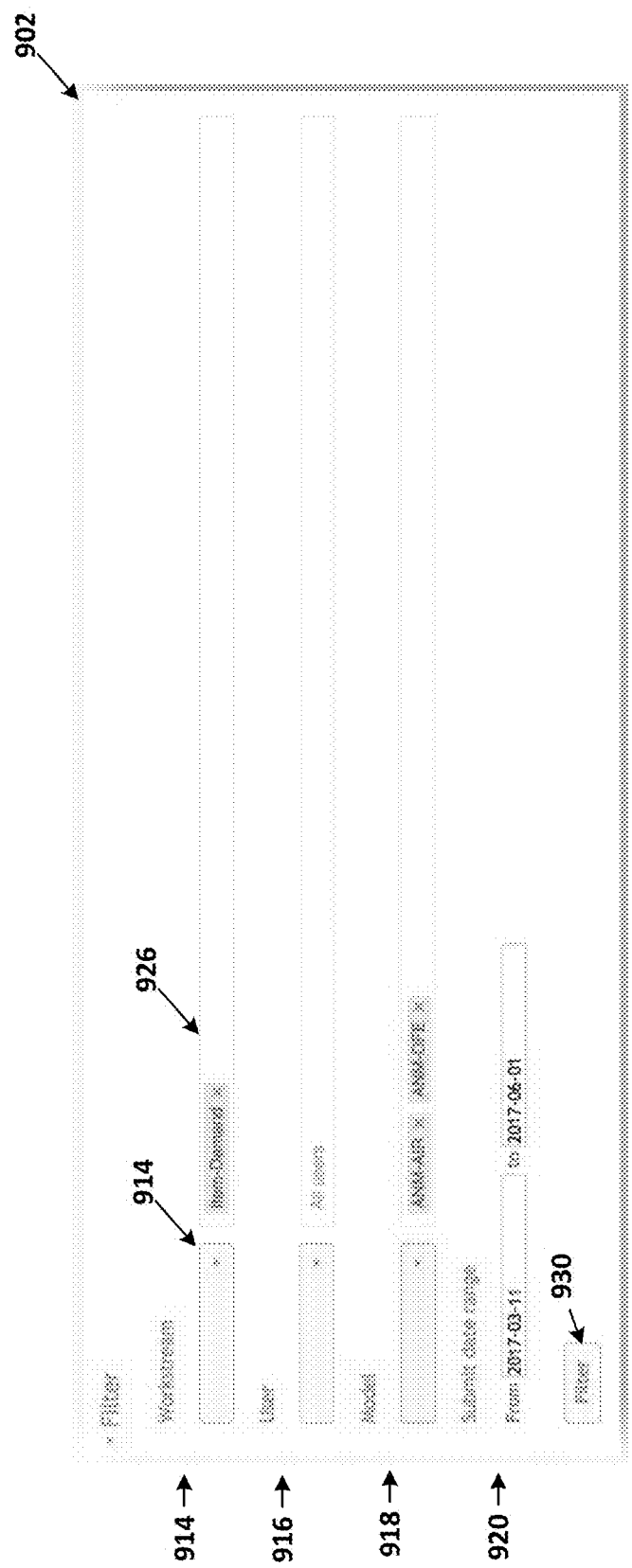
FIG. 10 illustrates a more detailed view of the filter section of the example user interface of FIG. 9.

Turning to FIG. 10, a more detailed view of the filter section 902 is displayed. The filter section allows the user to select uploaded validation sets with specific tags, such as user or model and or uploaded before/after a given date. The filter section includes subsections for work stream 914, user 916, model 918, and submit date range 920. Each subsection includes a drop-down list 924 and a tag editor 926. Elements can be selected from the drop-down list or typed into the tag editor text input fields. Tags are selected to filter validation sets. The tag values are drawn from a repository. The tags of all filtered validation sets must equal one of the values in all of the tag editors with at least one value. In the example shown in FIG. 10, validation sets with the work stream tag set to item demand and model tagged either ANM error or ANM-DFE will be selected. The two input fields under submit date range specify an inclusive range of dates restricting dates on which the filtered sets were uploaded. Pressing the filter button 1930 retrieves validation sets from the repository that satisfy the conditions in the tag editors and date input fields summaries of the retrieve sets appear in the table described in the next section.

Figure 11:
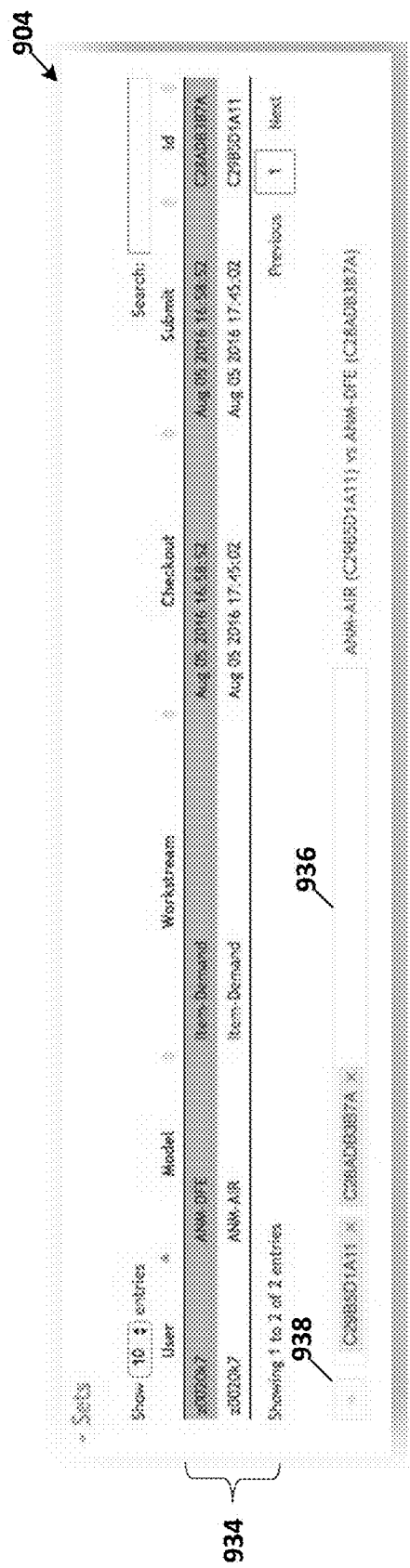
FIG. 11 illustrates a more detailed view of the sets section of the example user interface of FIG. 9.

FIG. 11 displays a more detailed view of the sets section 904. The sets section provides a summary table that displays the filtered validation sets from the repository. One or two validation sets can be selected for inspection or comparison.

Each row of the table 934 displayed in the sets section 904 represents a validation set in the repository that is filtered according to any criteria stipulated in the filter section 902. Each row of the table 934 includes information describing the validation set including user, model, work stream, check out time, submit time, and ID number. The ID number is a unique number generated upon upload of the validation set. A validation set can be selected from the table by clicking on the corresponding row and clicking the add button 938 to make it available for visualization. Once a set is added, its ID appears in the editor field 936 below the table. In this example, up to two validation sets can be selected at one time.

Figure 12:
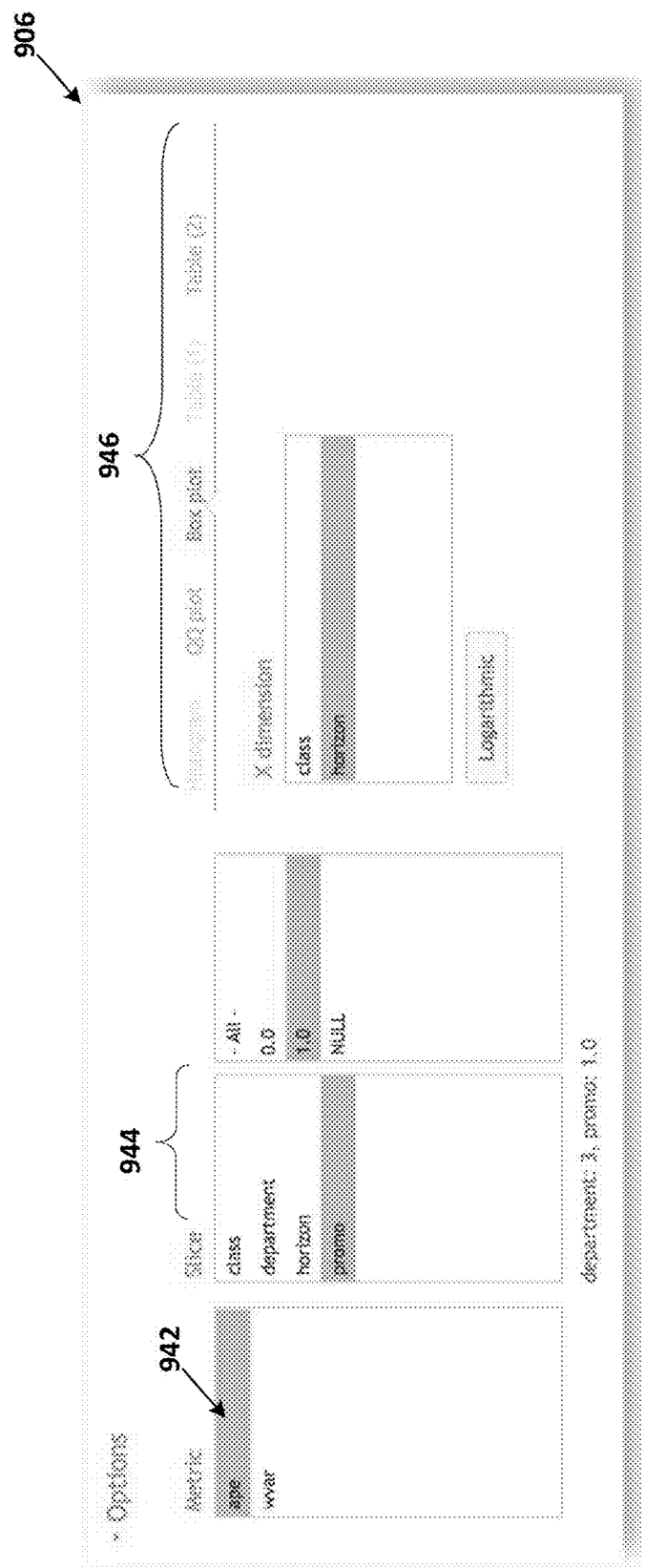
FIG. 12 illustrates a more detailed view of the options section of the example user interface of FIG. 9.

A more detailed view of the options section 906 is displayed in FIG. 12. The options section 906 allows a user to choose particular parts of the validation set or sets to inspect and to set options for those visualizations. The option section 906 allows a user to select aspects of the validation set for scrutiny, as well as the visualization to be used in options to be applied to the chosen visualization. The metric selector 942 selects one of the metrics contained in the chosen validation set. In the example of FIG. 12, a user has selected absolute percentage error (APE). The slice selector 944 includes two lists allowing a user to restrict the visualization to a subset of the metric values recorded in the validation sets. Restricting the validation set to two dimensions restricts attention to the metric values associated with those dimensions. Further restrictions can be added by selecting values for additional dimensions. The resulting restrictions are displayed below the lists. In the example of FIG. 12, the visualization has been restricted to APE values in department three for promotional items. A series of visualization tabs 946 show available visualizations. The available visualizations may change depending on the number of validation sets chosen and the number of slices chosen. Selecting a visualization tab 946 displays the settings for that visualization. In the example of FIG. 12, the available visualization tabs include histogram, Q-Q plot, box plot, table 1, and table 2. In this example, the settings displayed show dimensions for class and horizon. Additionally, a logarithmic button is displayed to modify the visualization.

Figure 13:
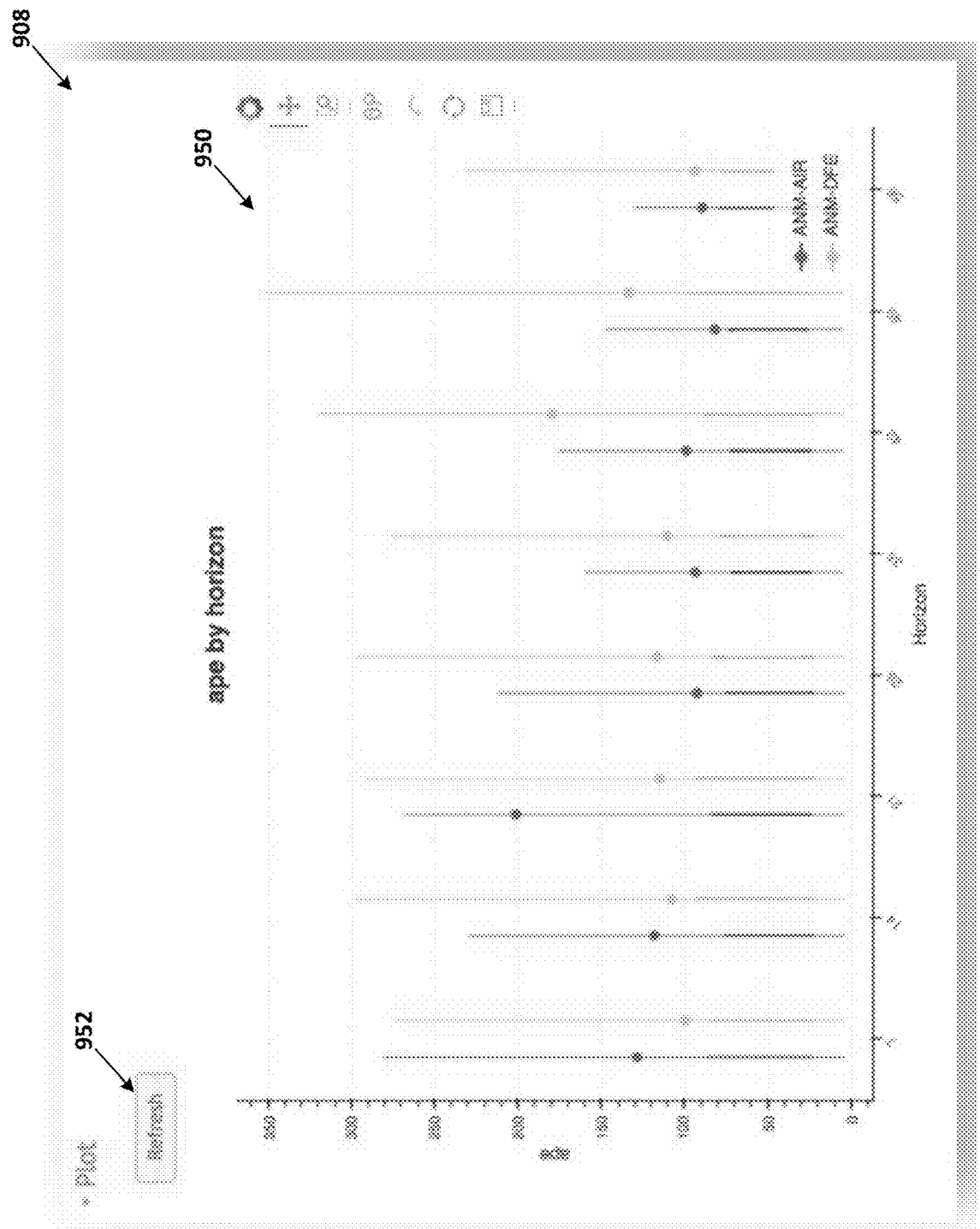
FIG. 13 illustrates a more detailed view of the plot section of the example user interface of FIG. 9.

FIG. 13 displays a more detailed view of the plot section 908. The plot section provides a display of the selected visualization for the chosen parts of the validation sets. The currently selected and configured visualization is displayed as applied to the selected validation set or sets and restricted according to the selected slice or slices. In this example, a box plot 950 is displayed for the dimensions of APE by horizon. Selecting the refresh button 952 plots the visualization. Additionally, if changes are made to the validation sets, metrics, slice, etc., any existing plot becomes partially obscured in the view as it becomes invalidated. Selecting the refresh button 952 will plot the updated selections.

Figure 14:
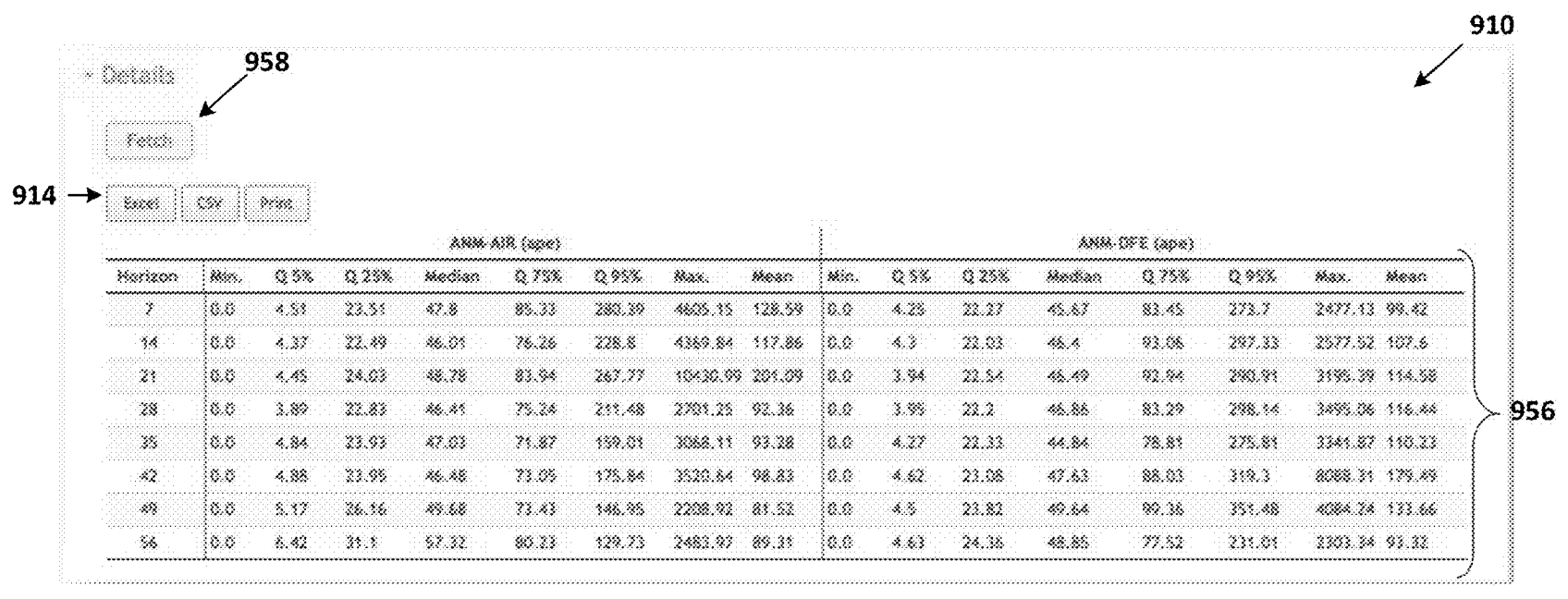

FIG. 14 displays a more detailed view of the details section 910 which shows, in tabular form, the data utilized in the visualization. A details table 956 is displayed including the information displayed in the plot section 908 visualization. The fetch button 958 retrieves the table data and updates the details table 956 after any changes of selections made in the options section 906, set section 904, or filters section 902. In some embodiments, one or more export buttons 960 may be selected to export the details table 956. In the example of FIG. 14, the export buttons 960 include an option to export the details table 956 to excel or CSD. A user could also select an export button 960 to print the details table 956.

Disaggregation

Sales data for individual stores on individual days can be very noisy because for any given item, the sales may be very low. If the number of sales over a particular time interval is too small, estimating the underlying rate of sales is extremely difficult, and the noise properties do not satisfy the requirements of many regression and machine learning techniques used for forecasting. For most items, aggregation at some level is necessary, especially for slow-selling items, in order to ensure sufficient counts within each location/time/item to satisfy the underlying model assumptions.

Another problem with forecasting based on individual item, at individual store, on individual day is that it would take much more storage space to store the demand forecasts generated for that level of granularity. It is advantageous to aggregate the data when the number of items being offered by the retail are very high so that data storage space can be conserved.

Sales can be aggregated based on location (useful to determine high precision in time), time (useful to determine high location-level precision), and collection of items (useful as a prior for new items). In one embodiment, sales are aggregated to generate forecasts for each item for a week across all stores in the retail chain.

Given an aggregate chain-level forecast, the disaggregation service estimates contributions from individual stores. To estimate the count rates at a high granularity among the dimensions of item, location, and day, the behavior over multiple aggregation dimensions is measured and interpolated. For example, the relative sales rates of an item for each store can be determined aggregating the sales over several months, which can then be combined with item/day/chain level forecasts (aggregated over all stores) to estimate the forecast for each individual store.

The disaggregation service can also measures how noise properties of counting discrete occurrences (sales) vary with the aggregate signal. Contributions of individual entities can be estimated, even if that contribution is too small to be detected directly.

Figure 15:
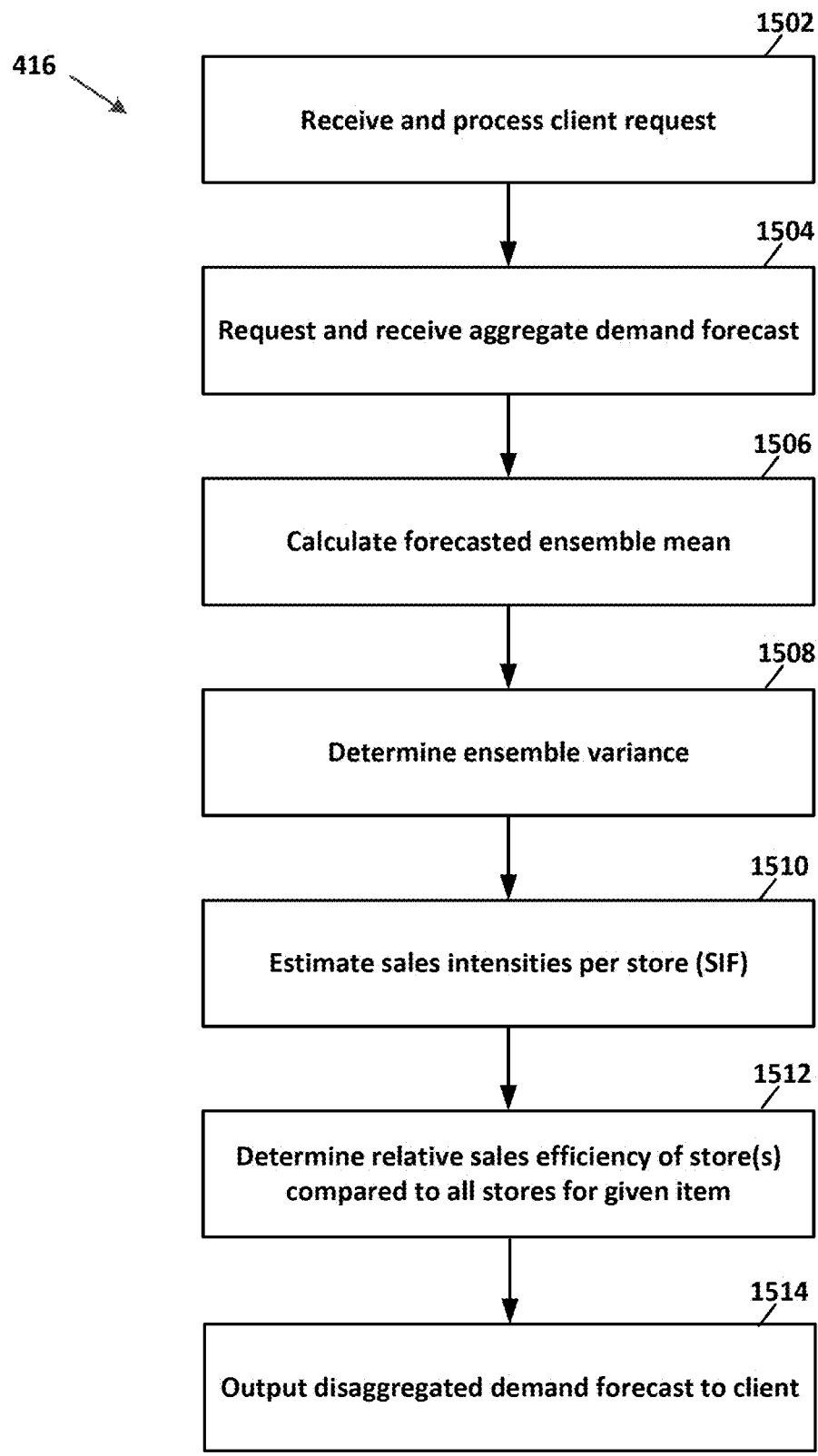
FIG. 15 is a flow chart of an example method of disaggregating an aggregate demand forecast.

FIG. 15 provides a flow chart of a method 416 of disaggregating an aggregate demand forecast to fulfill a client request. The disaggregation service 336 operates to break down aggregate demand forecasts into demand forecasts for shorter time periods or a smaller number of locations. In some embodiments, the forecast generator 304 produces demand forecasts for an entire retail chain of stores, for a week time period, for each individual item. In instances when a client requests a demand forecast for a particular day or a particular store, the disaggregation service 336 computes the demand forecast based on the aggregate demand forecasts stored in the forecasts data store 312.

At operation 1502, a client request is received and processed. In some embodiments, the server 330 receives the client request from the load balancer 324. The API 332 then processes the request to determine which data is needed to satisfy the request, and whether that data needs to be transformed in any way. The API 332 can determine which aggregate demand forecast to request. The API 332 also determines if the forecast requires disaggregation. In the example method of FIG. 15, disaggregation is required to satisfy the client request.

At operation 1504, the API 332 submits a query for the appropriate aggregate demand forecast. In the example of FIG. 3, the query is submitted to the resource manager 314 where the query service 318 accesses the aggregate demand forecast from the forecasts data store 312.

At operation 1506, the forecasted ensemble mean is calculated by the disaggregation service 340.

At operation 1508, the disaggregation service 340 determines the ensemble variance.

At operation 1510, the sales intensities per store (SIF) is estimated by the disaggregation service 336.

At operation 1512, the disaggregation service 336 determines the relative sales efficiency of the store or stores at issue compared to all other stores in the retail chain, for a given item.

At operation 1514, the disaggregated demand forecast is output to the client. The API communicates the demand forecast to the client. In some embodiments, the client accesses the forecast through a user interface.

Distributions Etc

The store Sales Intensity Function (SIF) provides a distribution of the expected values or average sales per unit time amongst all stores selling an item. The Sales Count Distribution (SCD) provides a distribution of the discrete sales counts per unit time across all stores selling an item. The Ensemble Variance Function (EVF) provides an empirical relation between the ensemble (aggregated over stores) mean and the ensemble variance.

The disaggregation methods operate on the assumption that the sales counts are poisson distributed (SPF follows a Poisson distribution) at item-store-day level. The store sales intensity function (SIF) is assumed to be a Gamma distribution and the SCD is assumed to be a Negative Binomial distribution.

The store sales intensity function (SIF) provides a distribution of the expected values or average sales per unit time amongst all stores selling an item. This calculation gives the number of stores per sales intensity interval for a given item. The SIF is used to determine the relative sales performance of each store for an item. The SIF is well-fit by a gamma distribution if a sufficient number of stores are selling the item. SIF shows the spread in sales performance across stores and can be used to compare individual store sales performance to the rest of the retail chain.

The discrete aggregated store sales count distribution (SCD) provides a distribution of the discrete sales counts at a given time across all stores selling an item. The SCD gives the number of stores per sales count number for a given item. The SCD is well-fit by a negative binomial distribution. SCD can be directly measured and fit on historical data, or estimated from aggregate or ensemble parameters.

In large retail chains, the number of store selling an item at any time can change, so aggregating the sum of sales will not be sufficient to provide an accurate forecast. To preserve information of how sales of each item are distributed across stores even after aggregating, the value counts of unit sales for each item-day are measured (i.e. how many stores sold N units of each item on each day). This probability mass function is the sales count distribution (SCD), which gives the number of stores per sales count number for a given item and time range. Beyond simply measuring a single aggregate statistic (like mean sales across all stores), the SCD provides a much fuller pictures of how the sales are distributed amongst the stores.

Across both time and item dimensions, the SCD at day-level and higher is well-fit by a negative binomial (NB) distribution.

Ensemble Variance Functions (EVF) provide an empirical relation between the ensemble (aggregated over stores) mean and the ensemble variance. If direct measurement or forecast of the ensemble variance is not available, an empirical relation between the ensemble mean and ensemble variance can be used to estimate. The ensemble variance across stores is highly correlated with the ensemble mean and is well-fit by a power-law The simplest disaggregation method is to just equally allocate the sales amongst the stores. This is the equivalent of each store having an instantaneous sales intensity equal to the average chain-level aggregate sales. Equal allocation primarily serves as a good baseline of comparison for other disaggregation methods.

A slightly more complex method is to use the fractional contribution of each individual location aggregated over time to provide a simple disaggregation mechanism. This method assumes that the relative contribution of each location is constant over time.

The negative binomial/gamma-poisson mixture is motivated by the empirical observations that the time-averaged SIF is well-fit by a gamma distribution and the SCd is well-fit by a negative binomial distribution. The negative binomial distribution can arise from a continuous mixture of Poisson distribution (i.e. a compound probability distribution) where the mixing distribution of the Poisson rate is a gamma distribution. This method assumes that aggregate sales counts across all stores per unit (SCD) is negative binomial distributed, the sales intensities per store (SIF) is gamma distributed, and the sales per unit time for an individual store (SPF) is Poisson distributed. Overall, the assumption is that the relative sales rates between stores for a particular item is stable over time.

Overall, instantaneous sales intensities for each location can be inferred from a combination of the instantaneous SIF and a known rank-order of each store's performance. While the SIF cannot be directly measured from the sales counts themselves due to too few counts, the relationship between the aggregate probability distributions can be leveraged to estimate the SIF parameters from the SCD parameters. Further, if the SCD is a negative binomial, then its parameters can be estimated directly from the ensemble mean and ensemble variance. Thus, a chain-level forecast can be disaggregated to the store-level given the forecasts ensemble mean, the ensemble variance, and the relative sales efficiency of each store.

Methods and systems of the present disclosure provide advantages over prior systems and methods for predicting item demand in every retail environment. One such advantage is the ability to provide real time updates to demand forecasting models and the demand forecasts that are produced by those models. The models and forecasts are updated as new data is received from the retailer such as new sales data from both retail store locations and web sales. Another advantage of the current system and methods is that the demand forecasts are scalable to accommodate various uses for the demand forecast data. For example, demand forecast data can be used to predict demand for items in a particular retail store on a particular date or demand can be calculated for an entire chain of retail stores for a given month. The system described herein can handle a massive amount of items being offered for sale (e.g. millions). However, the demand forecasts can also be customized for various levels of granularity depending on the client application requesting the demand forecast and the needs of that client location.

The present systems and methods provide a novel approach to solving the problem of accurately predicting demand for particular items within a retail context. The use of weighted component models to generate an ensemble demand forecasting model is novel and advantageous over prior art methods because it allows for flexibility throughout a long time period such as a year, to accommodate changes in demand that occur due to seasonality, holidays, and promotions.

Overall, the day-to-day accuracy of an ensemble forecasting model is not as important as predicting seasonal demand for items. For example, with school supplies, it is more important to predict general trends in item demand for school supplies for the back-to-school season then it is to accurately predict demand for school supplies items on a day-to-day basis throughout the entire year. This is because, for many retailers, school supplies are sold in the greatest quantities during the "back to school" season, or the months of August and September.

Due to the flexibility provided by the ensemble forecasting model approach, the demand forecasting systems and methods of the present disclosure are able to more accurately predict demand for items over the course of a year or a longer time period, taking into account changes in demand for seasonal items. Because so many items within a retail context have changing demand based on seasonality, whether the items are on promotion, or whether the items are relevant to a particular holiday, it is important to be able to take into account seasonal effects. The ensemble model comprising weighted component models is advantageous in that the weighting of the various models can be modified to take into account changes for demand throughout the year based on seasonal effects.

The presently disclosed methods and systems go beyond merely predicting how many units of each item customers are likely to buy. In the context of retailers having multiple retail store locations and a web based business, there are millions of opportunities to make sales to customers. As a result, computational methods are required to optimize item offerings to customers and to ensure that items are being stocked both in warehouses and at retail stores that are most likely to be in demand by customers. The present disclosure describes computational methods for analyzing both past sales data and currently occurring sales data to determine which items are going to be in the greatest demand for a given time period and a given location so that an overall retail system can position items and personnel such that customer demand will be met with the proper resources.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for forecasting demand for a plurality of items, the system comprising:
a common data preparation engine comprising:
a computing system including a standard data store, processor, and memory communicatively coupled to the processor, the memory storing instructions executable by the processor to:
continually receive sales data for a plurality of items sold within a retail enterprise;
incrementally process the sales data as it is received to convert the sales data to common format data; and
store the common format data in the standard data store;
an enterprise forecast engine comprising:
a computing system including a processor, and a memory communicatively coupled to the processor, the memory storing instructions executable by the processor to:
receive parameters for a demand forecast defining at least one of: one or more items of the plurality of items, a time period, and one or more locations of the retail enterprise;
access past forecasting performance data of a plurality of component models for the received parameters;
build an ensemble forecasting model using at least two of the plurality of component models, the at least two of the plurality of component models selected and weighted based on the past forecasting performance data;
access the common format data;
generate an aggregate demand forecast using the ensemble forecasting model and the common format data;
communicate the aggregate demand forecast to a forecasts data store for storage; and
continually update the ensemble forecasting model in response to real-time updates to the common format data and time period-based demand changes by modifying selection and weighting of the at least two of the plurality of component models used to build the ensemble forecasting model; and
a server comprising an API accessible by one or more client applications, the API configured to:
receive requests for demand forecasts,
communicate demand forecast requests to the forecasts data store, and
receive demand forecasts responsive to the demand forecast requests from the forecasts data store.

2. The system of claim 1, wherein the ensemble forecasting model is built from the at least two of the plurality of component models selected and weighted using an affine function.

3. The system of claim 1, wherein the at least two of the plurality of component models include one or more of an autoregressive integrated moving average (ARIMA) model or a locally estimated scatterplot smoothing (LOESS) model.

4. The system of claim 1, wherein the API is further configured to generate an administrator user interface for visualizing demand forecast data.

5. The system of claim 1, further comprising a cloud platform with at least one load balancer to direct demand forecast requests to one of a plurality of servers, including the server, for processing, the direction based on which of the plurality of servers is least busy processing other demand forecast requests.

6. The system of claim 1, wherein the past forecasting performance data is evaluated with a forecast validation engine by running multiple forecasts for one set of sales data and cross-validating distributions of results.

7. The system of claim 1, wherein the common data preparation engine is further configured to continually receive data, including the sales data and additional data, having different formats from a plurality of different sources and reformat the received data into the common format data to enable use of the data by the ensemble forecasting model.

8. The system of claim 7, wherein the additional data comprises at least one of the following: catalog data, location data, inventory data, promotion data, and planogram data.

9. The system of claim 1, wherein the past forecasting performance takes into account seasonal changes in demand.

10. The system of claim 1, further comprising a cumulative distribution function (CDF) service configured to convert the aggregate demand forecast into forecast distributions.

11. The system of claim 1, wherein the time period-based demand changes include at least one of demand changes based on seasonality and demand changes based on item promotions.

12. A method of forecasting demand for a plurality of items within a retail enterprise, the method comprising:
continually receiving sales data at a common data preparation engine, the sales data comprising past sales data and current sales data for sales of the plurality of items at locations of the retail enterprise, including physical stores and online;
incrementally processing the sales data as it is received to convert the sales data to common format data;
receiving parameters for a demand forecast, the parameters defining at least one of: one or more items of the plurality of items, a time period, and one or more locations of the retail enterprise;
building, with an enterprise forecast engine, an ensemble forecast model by combining two or more of a plurality of component models, the two or more of the plurality of component models selected and weighted based on an assessment of past forecasting performance of the plurality of component models for the received parameters;
continually updating the ensemble forecast model in response to real-time updates to the common format data and time period-based demand changes by modifying a selection and weighting of the two or more of the plurality of component models used to build the ensemble forecast model;
analyzing, with the ensemble forecast model, the common format data to generate an aggregate demand forecast; and
storing the aggregate demand forecast in a forecasts data store.

13. The method of claim 12, further comprising:
receiving, at an API, a request from a client application for a demand forecast for one or more items of the plurality of items;
querying the forecasts data store for an aggregate demand forecast corresponding to the request; and
responding to the client application with the requested demand forecast.

14. The method of claim 13, wherein the requested demand forecast is for an individual item, over a 1 week time period, for all sales of the retail enterprise.

15. The method of claim 13, wherein the request further comprises a time period, and a location of the retail enterprise.

16. The method of claim 13, wherein the request is communicated to a resource manager associated with a query service, and the query service accesses the aggregate demand forecast from the forecasts data store that matches the request.

17. The method of claim 13, wherein the requested demand forecast is visualized on a user interface for viewing and analysis by an administrator user.

18. The method of claim 12, further comprising, as part of the selection and weighting of each of the two or more of the plurality of component models used to build the ensemble forecast model, validating each of the two or more of the plurality of component models.

19. A non-transitory computer-readable storage medium comprising computer-executable instruction which, when executed by a computing system, cause the computing system to perform a method of generating a demand forecast for one or more items, the method comprising:
continually receiving store sales data and web sales data for a plurality of items sold within a retail enterprise at a common data preparation engine in real time;
incrementally processing the store sales data and web sales data to convert the store sales data and web sales data to common format data;
receiving parameters for a demand forecast, the parameters defining at least one of: one or more items of the plurality of items, a time period, and one or more locations of the retail enterprise;
building, with an enterprise forecast engine, an ensemble forecast model from two or more of a plurality of component models, the two or more of the plurality of component models selected and weighted based on an assessment of past forecasting performance of the plurality of component models for the received parameters;
analyzing, with the ensemble forecast model, the common format data to generate the demand forecast;
storing the demand forecast in a forecasts data store;
continually updating the ensemble forecast model in response to real-time updates to the common format data and time period-based demand changes by modifying a selection and weighting of the two or more of the plurality of component models used to build the ensemble forecast model;
receiving, at an API, a request from an administrator computing device for the demand forecast;
communicating the request to the forecasts data store;
communicating the demand forecast to a user interface on the administrator computing device; and
visualizing the demand forecast on a display of the administrator computing device.

20. The non-transitory computer-readable storage medium of claim 19, wherein building the ensemble forecast model comprises:
using an affine function to build the ensemble forecast model from the two or more of the plurality of component models selected and weighted.

* * * * *